United States Patent [19]
Alexandrov et al.

[11] 3,901,462
[45] Aug. 26, 1975

[54] DEVICE FOR BRAKING CONTAINERS

[76] Inventors: Adolf Moritsovich Alexandrov, Federativny prospekt, 6, korpus 3, kv. 8; Vladimir Efimovich Aglitsky, Zatsepeky val, 6/13, kv. 61; Ilya Solomonovich Kantor, Malo-Moskovskaya ultisa, 31, kv. 45; Jury Arnoldovich Topolyansky, Matveevskaya ulitsa, 10, korpus 4, kv. 233; Jury Abramovich Tsimbler, Sojuzny prospekt, 10, kv. 261, all of Moscow, U.S.S.R.

[22] Filed: May 2, 1974

[21] Appl. No.: 466,510

[30] Foreign Application Priority Data
July 27, 1973 U.S.S.R................................ 1954143

[52] U.S. Cl. ................................................. 243/38
[51] Int. Cl. ............................................ B65g 51/20
[58] Field of Search ............... 243/1, 19, 36, 37, 38; 302/1, 2; 104/138, 139, 155

[56] References Cited
UNITED STATES PATENTS
2,761,633   9/1956   Sindzinski............................. 243/38

FOREIGN PATENTS OR APPLICATIONS
1,259,791   1/1968   Germany ............................ 243/38

Primary Examiner—Evon C. Blunk
Assistant Examiner—Rowland James L.
Attorney, Agent, or Firm—Holman & Stern

[57] ABSTRACT

A device, comprising a pipe portion built-in a pipeline and having a braking member which is essentially a layer placed onto the inner surface of the pipe portion over a distance which is smaller than a half of the pipe portion cross-section, and made from a material whose friction coefficient is higher than that of the material of the pipe portion. The pipe portion is so mounted that it can turn around its longitudinal axis to bring the braking member into interaction with containers during the braking thereof and to retract the braking member into the position when the containers can freely pass through the pipe portion.

This embodiment of the braking device allows for its installation both at terminals of a pipeline and along its route to brake the containers in case of emergency.

1 Claim, 3 Drawing Figures

DEVICE FOR BRAKING CONTAINERS

The present invention relates to units for pneumatic transportation of goods in containers along a pipeline and, more particularly, to devices for braking the containers.

It is most expedient to make use of the device for braking containers, built according to the present invention, in units wherein goods are transported along a pipeline of a diameter of about or above one meter.

Known are devices for braking containers in the pipeline of the unit for pneumatic transportation of goods, comprising a pipe portion built-in the unit pipeline. Accomodated inside the pipe portion is a braking member which is essentially a lever partly extending into the pipe portion and forming with the longitudinal axis of the latter an acute angle. The lever is connected to a damper ensuring interaction of the lever with the support surface of the container in the course of braking thereof (cf. FRG Pat. No. 1,212,885; Cl. B 65g).

The above-described device for braking containers is made use of mainly for braking pneumatic mail containers and cannot be practically used for braking heavily loaded containers of relatively large dimensions.

Besides, these devices are used in units in which containers are moved in one direction only, and cannot be used in units for pneumatic transportation of goods in reversing containers, i.e., in cases when containers are moved along one and the same pipeline in opposite directions.

Known are devices for braking containers installed at loading and unloading terminals. These devices comprise a pipe portion built-in the pipeline and accomodating a braking member which is essentially a power cylinder whose rod mounts a clamp adapted to engage the bumper of the container placed on a bogie (cf. Author's Certificate No. 339,479; B 65, 51/32).

These devices can be installed only at loading or unloading terminals, and cannot be lodged in the pipeline at certain points of the route to brake containers in case of breakdown discontinuation in the gas flow delivery in the pipeline.

An object of the present invention is to provide a device for braking containers, employing such a braking member that would make it possible to install the device on the pipeline route and use it for braking containers in case of emergency.

Another object of the present invention is to provide such a device for braking containers that could be used in units for pneumatic transportation of goods in containers reversing in one and the same pipeline.

In accordance with the above and other objects provision is made for a device for braking containers in the pipeline of a unit for pneumatic transportation of goods, comprising a pipe portion built-in the pipeline and accomodating a braking member adapted to interact with containers during the braking thereof in, which device, according to the invention, the braking member is essentially a layer placed onto the inner surface of the pipe portion over a distance which is smaller than a half of the pipe portion cross-section, and made from a material whose friction efficiency is greater than that of the material of the pipe portion mounted so that it can turn around its longitudinal axis to bring the braking member into interaction with the containers during the braking thereof and to retract the braking member into a position when containers can freely pass through the pipe portion.

The device for braking containers in the pipeline of the unit for pneumatic transportation of goods, made according to the present invention, can be installed either along the pipeline route to quickly brake heavily loaded containers in case of unexpected discontinuation of the gas flow in the pipeline, or at loading and unloading terminals.

Other objects and advantages of the device for braking containers will become apparent from the following description of an exemplary embodiment of the present invention made with reference to the accompanying drawings, in which.

Figure 1:
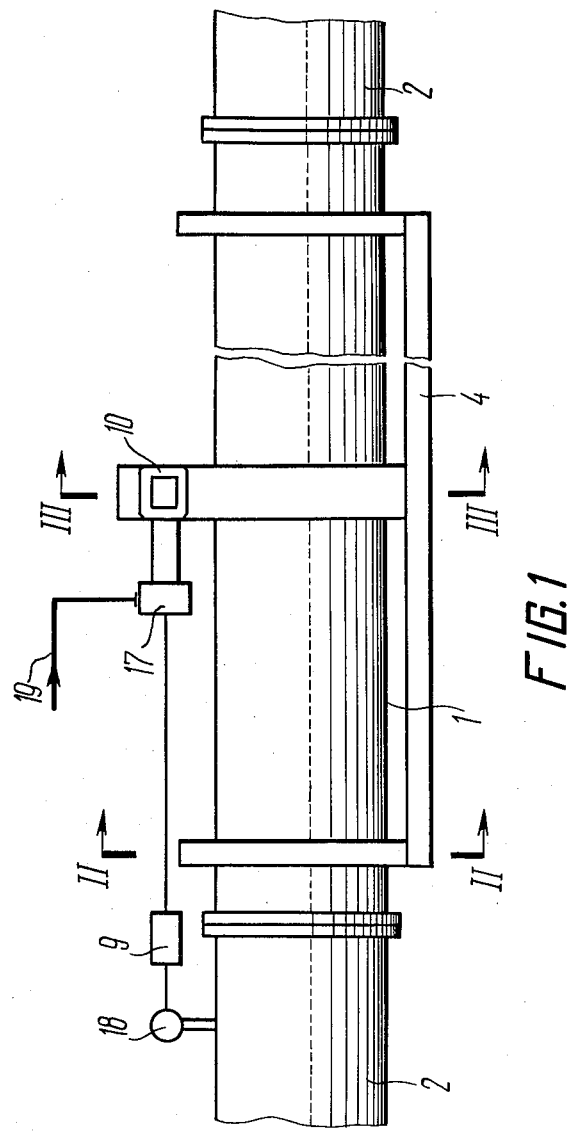
FIG. 1 shows a general view of the device for braking containers, in accordance with the present invention.
Figure 3:
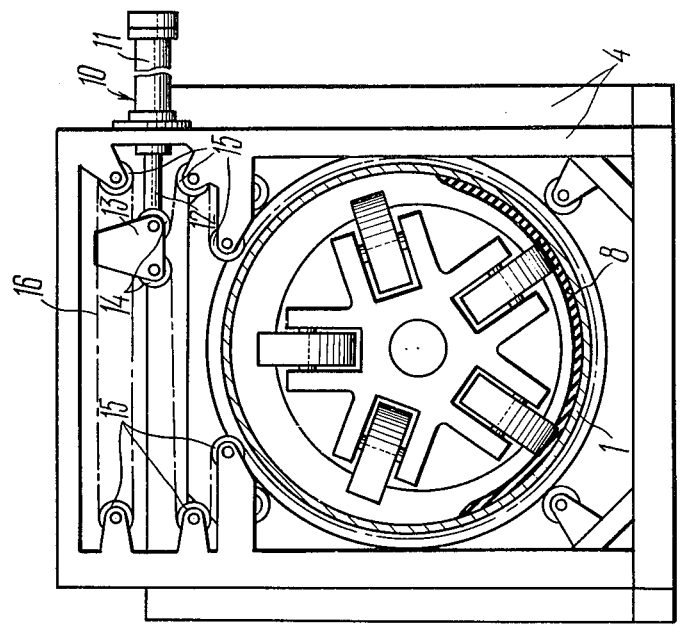
FIG. 3 is a section taken along line III—III in FIG. 1 showing the braking member in the position when it brakes containers, an enlarged view.

A device for braking containers comprises a pipe portion 1 (FIG. 1) built into a pipeline 2 of a unit for pneumatic transportation of goods, along which containers 3 (FIG. 2) placed on wheels move in a gas flow. The pipe portion 1 is mounted on a stationary frame 4, whereby rollers 5 serve as supports of the pipe portion 1, axes 6 of the rollers 5 being fastened to the frame 4. A support ring 7 is fitted on the pipe portion 1 at the point of disposition of the rollers 5.

Disposed inside the pipe portion 1 is a braking member 8 comprising a layer placed onto the inner surface of the pipe portion 1 having a width that is less than a half of the pipe portion inner circumference. This layer is made from rubber or some other elastic material suitable for the purpose, the layer being adhered to the pipe portion 1 inner surface either by means of vulcanization, or with the aid of glue. The friction coefficient of the couple "container-braking member" exceeds considerably that of the couple "container-pipe."

When containers are moving freely along the pipeline the braking member is disposed at the top. In order to lower the braking member 8, i.e., to start braking the containers, the pipe portion 1 is mounted on the frame 4 so that it can be rotated through 180° about its longitudinal axis. The pipe portion 1 is rotated by means of a drive which comprises a power source 9 (FIG. 1), for example a battery, and a power cylinder 10 whose body 11 is secured to the frame 4, and rod 12 is connected to a carriage 13 carrying two rollers 14.

The frame 4 has rollers 15 fastened thereto. The rollers 14 and 15 and the pipe portion 1 are embraced by a continuous rope 16 which is dead fastened at two points — on the carriage 13 and on the outer surface of the pipe portion 1. The rollers 14 and 15 form a pulley block which ensures a 180° turn of the pipe portion 1 while the rod 12 is performing a rather short stroke. The power sorce 9 is coupled with the power cylinder 10 via a control unit 17 (FIG. 1). The power source 9 is connected to a sensor 18 for emergency discontinuation of the gas flow in the pipe 2. As the sensor 18 for emergency discontinuation of the gas flow use may be made of a pick-up effecting control over the current in the linear control circuits (not shown) energized by the power sources ensuring operation of the air blowers (not shown).

The device for braking containers in the pipeline of the unit for pneumatic transportation of goods functions as follows.

Figure 2:
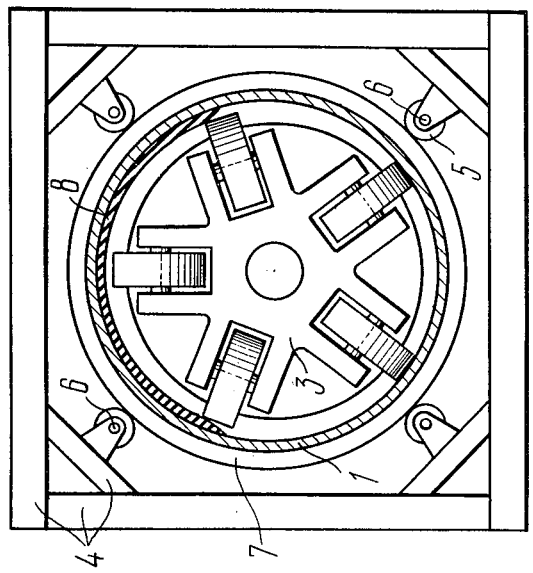
FIG. 2 is a section taken along line II—II in FIG. 1, showing the braking member in the position when containers can frelly pass through a pipe portion, an enlarged view.

Under normal conditions of the unit operation the pipe portion 1 is in the position when the braking member 8 is disposed at the top as shown in FIG. 2 so that the braking member 8 and the containers 3 are out of frictional contact so that the containers can freely pass through the pipe portion 1.

At the moment the supply of the gas flow into the pipeline 2 is discontinued, the sensor 18 switches on by its signal the power source 9 which via the control unit 17 ensures switching on of the power cylinder 10. While extending from the cylinder 12 the rope 16 turns the pipe portion 1 through 180° around its longitudinal axis, the braking member 8 being disposed at the bottom. On getting into the pipe portion 1 containers 3 are braked owing to a much higher friction coefficient of the couple "container-braking member." The length of the braking distance and, consequently, that of the pipe portion 1, depend on the speed of the containers, their weight and design, as well as the material of the wheels of the containers and the braking member.

The pipe portion 1 is turned into the position when the containers can freely pass therethrough by issuing via the connecting circuit 19 the external signal "restoration of the gas flow" into the control unit 17. The rod 12 is retracted into the cylinder, thereby ensuring the turn of the pipe portion 1 into the position when the braking member 8 is disposed at the top.

What we claim is:

1. A device for braking containers in the pipeline of a unit for pneumatic transportation of goods, comprising a pipe portion built into the pipeline; a braking member comprising a layer placed onto the inner surface of said pipe portion and having a width which is less than a half of the pipe portion inner circumference; said braking member being made from a material having a friction coefficient that is higher than that of the material of the pipe portion; said pipe portion being mounted for rotation around its longitudinal axis between a position in which said braking member and said containers are brought into frictional contact during the braking of the latter and an alternate position in which said braking member and said containers are out of frictional contact so that said containers can freely pass through said pipe portion.

* * * * *